(12) United States Patent
Bavaresco et al.

(10) Patent No.: US 9,463,811 B2
(45) Date of Patent: Oct. 11, 2016

(54) CABLE TRANSPORTATION SYSTEM AND RELATIVE DRIVE METHOD

(71) Applicant: ROPFIN B.V., Leimuiden (NL)

(72) Inventors: Federico Bavaresco, Fie' Allo Sciliar (IT); Giuseppe Conte, Bolzano (IT)

(73) Assignee: ROPFIN B.V., Leimuiden (NL)

( * ) Notice: Subject to any disclaimer, the term of this patent is extended or adjusted under 35 U.S.C. 154(b) by 108 days.

(21) Appl. No.: 14/486,657

(22) Filed: Sep. 15, 2014

(65) Prior Publication Data

US 2015/0000547 A1    Jan. 1, 2015

Related U.S. Application Data

(63) Continuation of application No. 12/596,801, filed as application No. PCT/EP2008/054774 on Apr. 18, 2008, now Pat. No. 8,844,446.

(30) Foreign Application Priority Data

Apr. 20, 2007 (IT) .............................. MI2007A0835

(51) Int. Cl.
| | | |
|---|---|---|
| B61B 9/00 | (2006.01) | |
| B61B 12/12 | (2006.01) | |
| B61D 43/00 | (2006.01) | |
| B60L 11/18 | (2006.01) | |
| B60R 16/03 | (2006.01) | |
| B61B 12/10 | (2006.01) | |

(52) U.S. Cl.
CPC ................. *B61B 9/00* (2013.01); *B60L 11/18* (2013.01); *B60R 16/0307* (2013.01); *B61B 12/10* (2013.01); *B61B 12/125* (2013.01); *B61D 43/00* (2013.01); *Y02T 30/36* (2013.01)

(58) Field of Classification Search
CPC ............. B61B 7/00; B61B 7/02; B61B 7/06; B61B 9/00; B61B 12/00; B61B 12/10; B61B 12/12; B61B 12/125
USPC ......... 104/165, 173.1, 173.2, 174, 175, 178, 104/179, 200–206
See application file for complete search history.

(56) References Cited

U.S. PATENT DOCUMENTS

| | | |
|---|---|---|
| 472,211 A | 4/1892 | Fralinger |
| 1,944,446 A | 1/1934 | McGowen |

(Continued)

FOREIGN PATENT DOCUMENTS

| | | |
|---|---|---|
| AT | 315910 | 6/1974 |
| AT | 342655 | 4/1978 |

(Continued)

OTHER PUBLICATIONS

EPO Notice of Opposition for European Application No. 08736407.1 dated Dec. 14, 2012.

*Primary Examiner* — R. J. McCarry, Jr.
(74) *Attorney, Agent, or Firm* — Neal, Gerber & Eisenberg LLP

(57) ABSTRACT

A cable transportation system has rails and a draw cable, both extending along a transportation path, a drive member for driving the draw cable; at least one vehicle, which moves along the transportation path and has wheels which roll along the rails, and a coupling device for connecting the vehicle to the draw cable, at least one passenger station where the vehicle is stopped and an electric machine located on the vehicle and driven by the wheels to generate electric power.

34 Claims, 3 Drawing Sheets

(56) References Cited

U.S. PATENT DOCUMENTS

| | | | |
|---|---|---|---|
| 2,662,587 A | 12/1953 | McIlvaine | |
| 2,710,650 A | 6/1955 | Sowder | |
| 2,985,224 A | 5/1961 | Sowder | |
| 3,170,412 A | 2/1965 | Sowder | |
| 3,934,517 A | 1/1976 | Hirsig | |
| 4,185,562 A | 1/1980 | Hatori et al. | |
| 4,226,187 A | 10/1980 | Paulsen et al. | |
| 4,269,123 A | 5/1981 | Segafredo | |
| 4,280,411 A | 7/1981 | Katayose et al. | |
| 4,462,314 A | 7/1984 | Kunczynski | |
| 4,470,355 A | 9/1984 | Kunczynski | |
| 4,473,011 A | 9/1984 | Wuschek | |
| 4,640,197 A | 2/1987 | Brian | |
| 4,641,587 A | 2/1987 | Dalliard | |
| 4,671,187 A | 6/1987 | Kunczynski | |
| 4,833,997 A | 5/1989 | Cathiard | |
| 4,898,100 A | 2/1990 | Brochand | |
| 5,107,771 A | 4/1992 | Kainz | |
| 5,113,768 A | 5/1992 | Brown | |
| 5,226,368 A | 7/1993 | Brochand et al. | |
| 5,465,806 A | 11/1995 | Higasa et al. | |
| 5,515,789 A | 5/1996 | Brochand et al. | |
| 5,517,923 A * | 5/1996 | Cathiard | B61B 9/00 104/173.1 |
| 5,562,040 A | 10/1996 | Egli | |
| 5,582,109 A | 12/1996 | Levi et al. | |
| 5,595,122 A | 1/1997 | Levi et al. | |
| 6,345,578 B1 | 2/2002 | Pabst | |
| 6,543,366 B2 | 4/2003 | Pabst et al. | |
| 6,585,232 B2 | 7/2003 | Rechenmacher | |
| 6,615,118 B2 * | 9/2003 | Kumar | B60L 7/12 290/3 |
| 7,410,068 B1 | 8/2008 | Andreetto | |
| 7,549,377 B2 | 6/2009 | Pabst | |
| 2002/0026839 A1 | 3/2002 | Lehtovaara | |
| 2002/0088368 A1 | 7/2002 | Pabst et al. | |
| 2006/0249718 A1 | 11/2006 | Levi | |
| 2007/0169660 A1 | 7/2007 | Pabst | |
| 2008/0115689 A1 | 5/2008 | Heil et al. | |
| 2009/0165666 A1 | 7/2009 | Pabst et al. | |
| 2009/0165668 A1 | 7/2009 | Andreetto | |

FOREIGN PATENT DOCUMENTS

| | | |
|---|---|---|
| AT | 373832 | 2/1984 |
| AT | 388146 | 5/1989 |
| AT | 390926 | 7/1990 |
| CH | 259291 | 1/1949 |
| CH | 360704 | 3/1962 |
| CH | 554761 | 10/1974 |
| DE | 423865 | 1/1926 |
| DE | 1588622 | 5/1970 |
| DE | 2020746 | 12/1971 |
| DE | 2101743 | 9/1972 |
| DE | 3109294 | 10/1982 |
| DE | 3834116 | 5/1989 |
| DE | 3927757 | 3/1991 |
| DE | 19756904 | 6/1998 |
| DE | 102006040220 | 8/2008 |
| EP | 0055955 | 7/1982 |
| EP | 0135239 | 3/1985 |
| EP | 0218306 | 4/1987 |
| EP | 0218897 | 4/1987 |
| EP | 0281205 | 9/1988 |
| EP | 0491632 | 6/1992 |
| EP | 0517622 | 12/1992 |
| EP | 0613807 | 9/1994 |
| EP | 0640518 | 3/1995 |
| EP | 0687607 | 12/1995 |
| EP | 0692418 | 1/1996 |
| EP | 0745526 | 12/1996 |
| EP | 0970864 | 1/2000 |
| EP | 1077167 | 2/2001 |
| EP | 1088729 | 4/2001 |
| EP | 1174323 | 1/2002 |
| EP | 1195305 | 4/2002 |
| EP | 1209055 | 5/2002 |
| EP | 1331151 | 7/2003 |
| EP | 1364853 | 11/2003 |
| FR | 891743 | 3/1944 |
| FR | 913146 | 8/1946 |
| FR | 1100001 | 9/1955 |
| FR | 1199721 | 12/1959 |
| FR | 1423648 | 1/1966 |
| FR | 2340895 | 9/1977 |
| FR | 2387830 | 11/1978 |
| FR | 2391450 | 12/1978 |
| FR | 2392858 | 12/1978 |
| FR | 2562857 | 10/1985 |
| FR | 2670452 | 6/1992 |
| FR | 2706404 | 12/1994 |
| FR | 2823482 | 10/2002 |
| FR | 2867142 | 9/2005 |
| GB | 1242749 | 8/1971 |
| GB | 1326264 | 8/1973 |
| GB | 1353030 | 5/1974 |
| GB | 1460106 | 12/1976 |
| GB | 2017024 | 9/1979 |
| WO | WO2004067347 | 8/2004 |
| WO | WO2004085221 | 10/2004 |
| WO | WO2005032901 | 4/2005 |
| WO | WO2008020021 | 2/2008 |
| WO | WO2008129017 | 10/2008 |
| WO | WO2009019259 | 2/2009 |
| WO | WO2009053485 | 4/2009 |

* cited by examiner

CABLE TRANSPORTATION SYSTEM AND RELATIVE DRIVE METHOD

PRIORITY CLAIM

This application is a continuation of, claims the benefit of and priority to U.S. patent application Ser. No. 12/596,801, filed on Mar. 3, 2010, which is a national stage application of PCT/EP2008/054774, filed Apr. 18, 2008, which claims the benefit of and priority to Italian Patent Application No. MI2007A 000835, filed on Apr. 20, 2007, the entire contents of which are incorporated herein.

TECHNICAL FIELD

The present disclosure relates to a cable transportation system. More specifically, the present disclosure relates to a cable transportation system comprising rails and a draw cable, both extending along a transportation path; a drive member for driving the draw cable; and at least one stop station, located along the transportation path, for a vehicle which moves along the transportation path and comprises wheels which roll along the rails, and a coupling device for connecting the vehicle to the draw cable.

BACKGROUND

Cable transportation systems are described in Patents EP 0 687 607 B1 and EP 1 088 729 B1, and have proved particularly suitable for passenger transport, and cheaper than other passenger transport systems in given urban applications and for given passenger transport requirements.

In certain known cable transportation systems, each vehicle is drawn by the draw cable along the transportation path on the rails, and, at the passenger station, is released from the draw cable and moved along by deceleration conveyors and acceleration conveyors, which engage both sides of the vehicle at the passenger station.

In these known systems, the deceleration conveyors operate when the vehicle is released from the draw cable, to brake and stop the vehicle in a stop position allowing passengers to board and alight; and the acceleration conveyors operate downstream from the stop position at the station, to accelerate the vehicle from the stop position to a speed substantially equal to the speed of the draw cable, so the coupling device can reconnect the vehicle smoothly to the draw cable.

In these known systems, each vehicle can only be powered electrically at the passenger station, during the relatively short time it remains in the stop position, which therefore greatly restricts electric power supply on the vehicle itself, and the possibility of equipping the vehicle with electrically powered user devices for enhanced passenger comfort.

The same lack of power supply also exists in other types of cable systems, in which the vehicle is connected permanently to the cable, and is stopped at the passenger stations by stopping the draw cable. This type of cable system is normally referred to as a "to-and-fro" system, and the passenger stations are normally, though not necessarily, located at the ends of the path.

SUMMARY

It is an advantage of the present disclosure to provide a cable transportation system of the above type, designed to eliminate the drawbacks in the known art.

According to various embodiments of the present disclosure, there is provided a cable transportation system comprising rails and a draw cable, both extending along a transportation path; a drive member for driving the draw cable; at least one vehicle, which moves along the transportation path and comprises wheels which roll along the rails, and a coupling device for connecting the vehicle to the draw cable; and at least one passenger station where the vehicle is stopped; the vehicle comprising an electric machine driven by the wheels to generate electric power on board the vehicle and the coupling device being selectively disconnectable at the passenger stations; wherein the vehicle comprises a control unit and a selector, the control unit being suitable to set the selector to a dissipating operating mode to regulate the amount of power dissipated and so regulate the braking force of the electric machine.

The present disclosure also relates to a method of driving a cable transportation system.

According to various embodiments of the present disclosure, there is provided a method of driving a cable transportation system comprises advancing a vehicle fitted with wheels resting on rails extending along a transportation path; driving the vehicle by a draw cable extending along the transportation path and driven by a drive member; stopping the vehicle at at least one passenger station located along the transportation path; and driving an electric machine by the wheels of the vehicle, to generate electric power on board the vehicle; regulating electric power flow to and from the electric machine by a selector on board the vehicle; and regulating by said selector dissipation of the electric power generated by the electric machine, so as to regulate the braking force of the electric machine.

Additional features and advantages are described in, and will be apparent from, the following Detailed Description and the figures.

BRIEF DESCRIPTION OF THE DRAWINGS

A number of non-limiting embodiments of the present disclosure will be described by way of example with reference to the accompanying drawings, in which:

FIG. 4 shows a plan view, with parts removed for clarity, of a cable transportation system in accordance with a second embodiment of the present disclosure.

DETAILED DESCRIPTION

Figure 1:
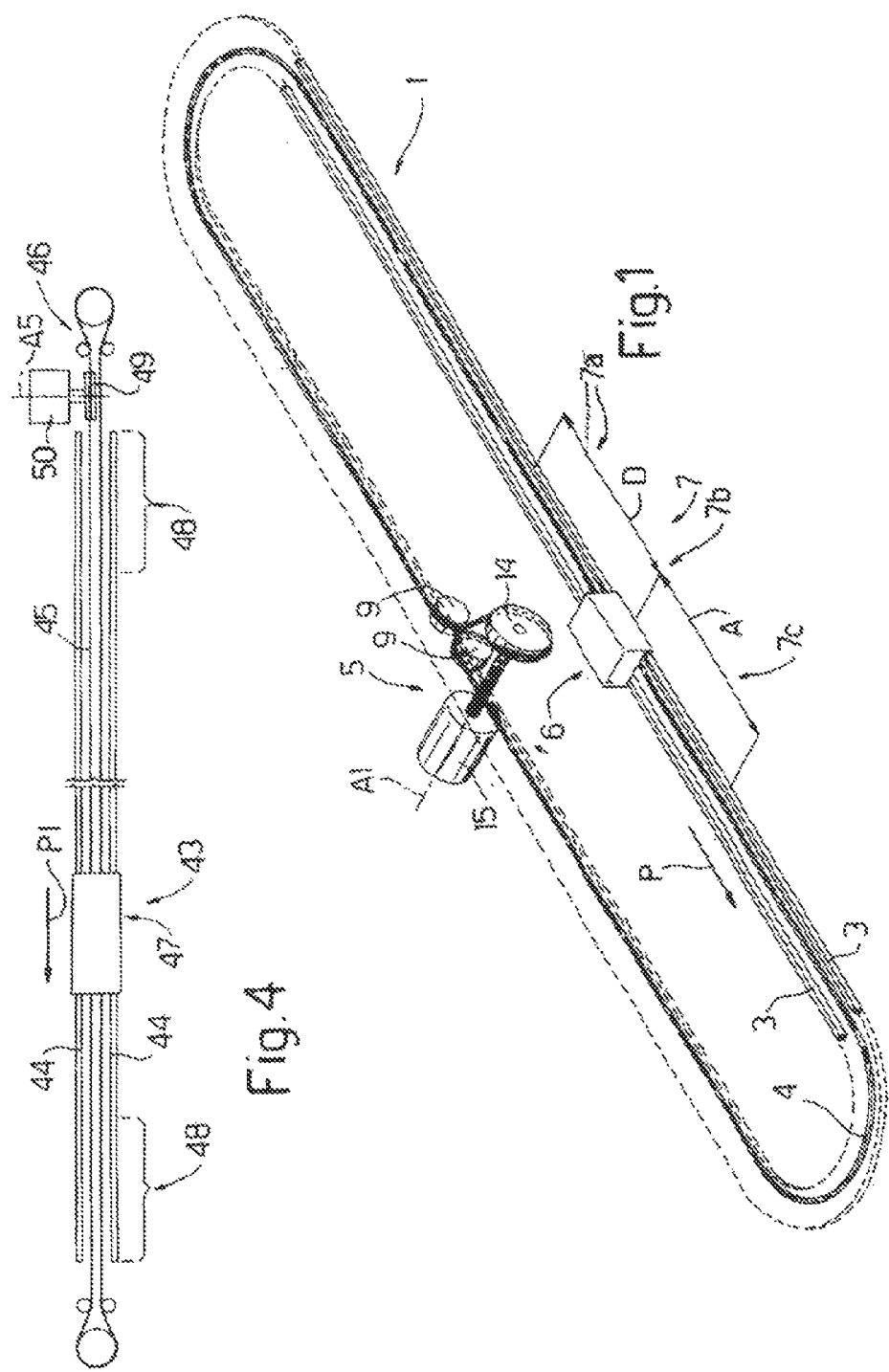
FIG. 1 shows a view in perspective, with parts removed for clarity, of a cable transportation system in accordance with a first embodiment of the present disclosure.

Referring now to the example embodiment of the present disclosure illustrated in FIGS. 1 to 4, number 1 in FIG. 1 indicates a cable transportation system for passenger transport. Cable transportation system 1 comprises a fixed structure 2 (FIG. 2) for supporting a pair of parallel rails 3 defining an endless transportation path P; a continuous draw cable 4 extending along transportation path P; a drive station 5 for driving draw cable 4; a number of vehicles 6 (only one shown in FIG. 1) movable along transportation path P and connectable selectively to draw cable 4; and a number of passenger stations 7 (only one shown in FIG. 1) where each vehicle 6 is stopped cyclically to allow passengers to board and alight from vehicle 6.

Passenger station 7 comprises a deceleration portion 7a, of length D, where vehicle 6 is decelerated; a stop position 7b, where vehicle 6 is stopped; and an acceleration portion 7c, of length A, where vehicle 6 is accelerated.

Figure 2:
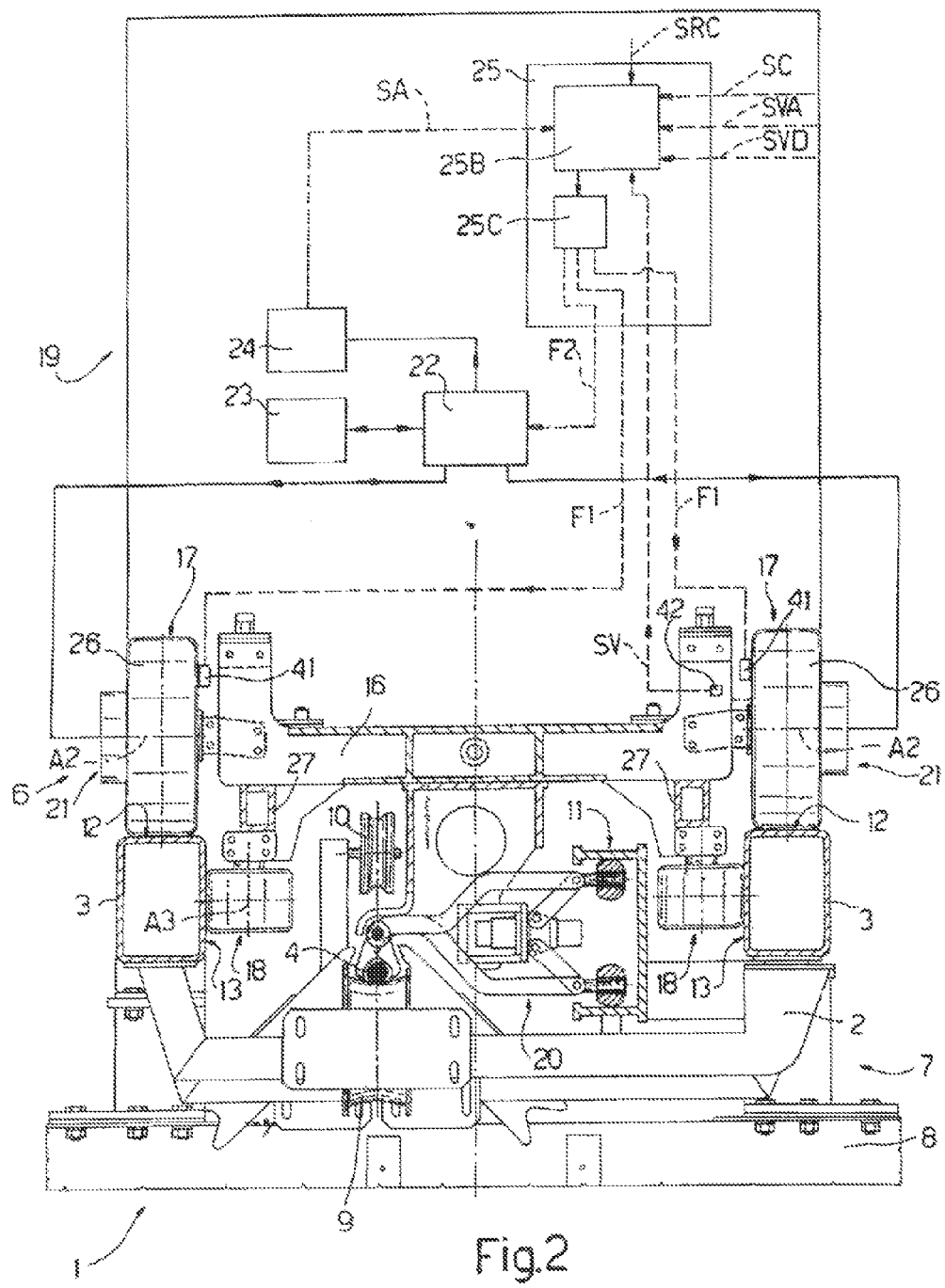
FIG. 2 shows a larger-scale front elevation, with parts in section and parts removed for clarity, of the FIG. 1 cable system.

With reference to FIG. 2, fixed structure 2 is anchored to a base 8, and provides for supporting rails 3, guiding draw cable 4 by guide rollers 9 and 10, and supporting a pair of runners 11 extending at passenger station 7, and which cooperate with vehicle 6 to connect and release vehicle 6 to and from draw cable 4. Each rail 3 has a top supporting face 12 and an inner lateral supporting face 13.

With reference to FIG. 1, the two runners 11 extend along path P, between the two rails 3, at deceleration portion 7a and acceleration portion 7c, as described in Patent EP 0687 607 B1.

The stop position 7b separating deceleration portion 7a and acceleration portion 7c is defined with a narrow tolerance of about 20 cm (or 7.87 inches).

Drive station 5 comprises a winch 14 of axis A1; and an electric motor 15 for rotating winch 14 about axis A1 continuously at constant speed, and moving draw cable 4 at constant speed along path P.

With reference to FIG. 2, vehicle 6 comprises a frame 16; a number of supporting wheels 17; a number of direction wheels 18; a cab 19 on top of frame 16; and a coupling device 20 for connection to draw cable 4. Coupling device 20 is of the type described in Patent EP 0687 607 B1, and cooperates with the two runners 11 at each passenger station 7 as described in Patent EP 0687 607 B1.

For each supporting wheel 17, vehicle 6 comprises an electric machine 21, which acts as a generator, motor, and brake. Vehicle 6 comprises a selector 22 for modulating electric power flow; an electric power accumulator 23; an electric user device 24; and a control unit 25, in turn comprising a computing module 25B and a regulating module 25C.

Each wheel 17 is directional, rotates about a horizontal axis A2, and comprises a tire 26 resting on the top supporting face 12 of a rail 3; and each direction wheel 18 rotates about a vertical axis A3, is forced against the inner lateral supporting face 13 of a rail 3 by elastic members (not shown), and is fitted to a movable arm 27 connected to a respective wheel 17, and which imparts a steering moment to wheel 17, depending on the position of direction wheel 18. This method of orienting wheels 17 is made possible by axis A3 of direction wheel 18 and axis A2 of respective wheel 17 lying in different planes.

Figure 3:
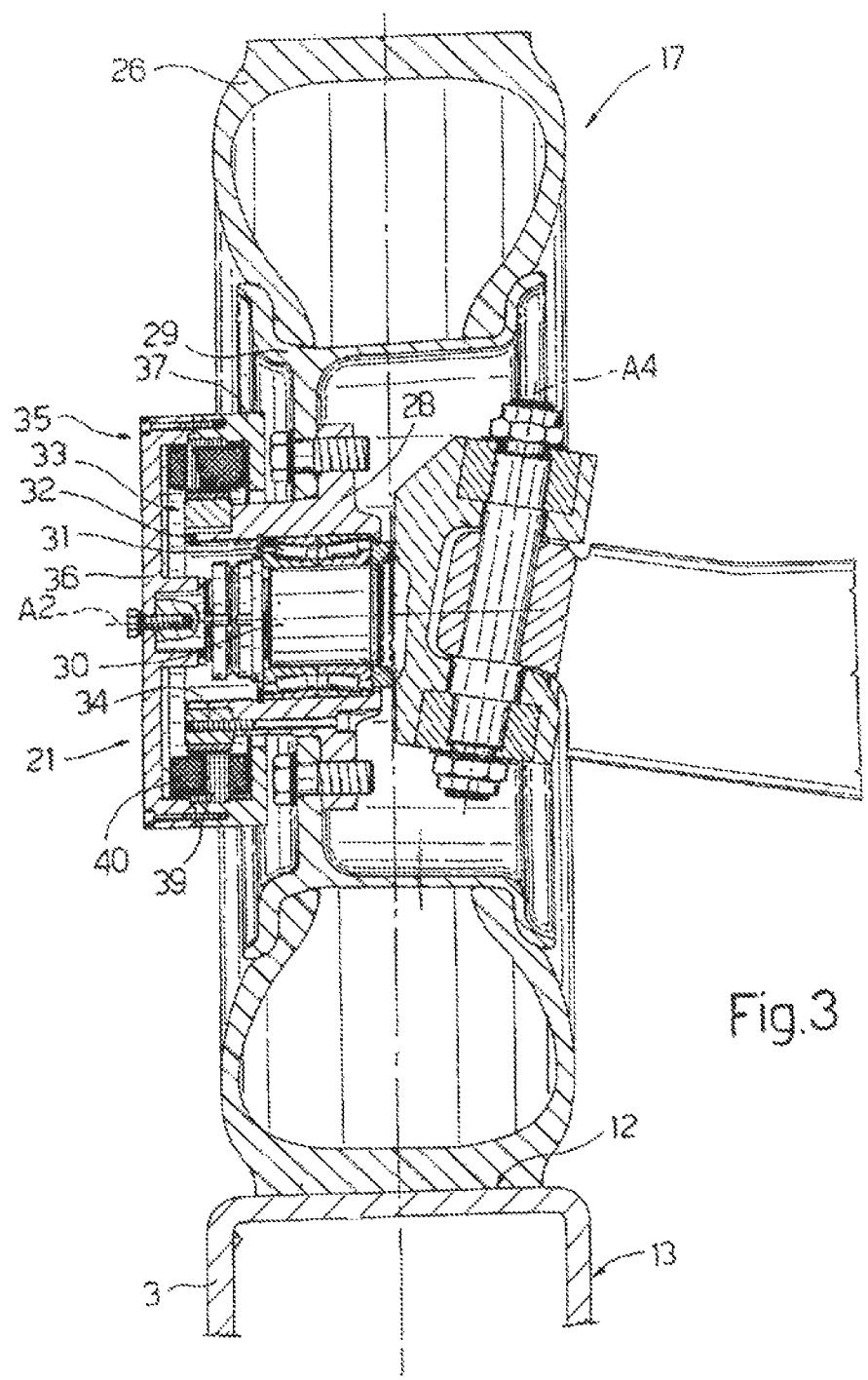
FIG. 3 shows a larger-scale section, with parts removed for clarity, of a detail of a vehicle forming part of the FIG. 1 system.

With reference to FIG. 3, each wheel 17 comprises a hub 28 supporting a wheel rim 29, in turn supporting tire 26, and is mounted to rotate about a pin 30 connected to arm 27 and hinged to frame 16 about a steering axis A4. A rolling bearing 31 is interposed between pin 30 and hub 28. Hub 28 comprises an annular portion 32 projecting on the opposite side to frame 16, and in which is formed a seat for the rotor 33 of electric machine 21. Each wheel 17 has a cover 35 formed by two connected flanges 36 and 37, which enclose an annular stator 38 of electric machine 21. Cover 35 is fixed to pin 30, and provides for supporting stator 38 and protecting electric machine 21 from the surrounding environment. Stator 38 comprises a core 39 of ferromagnetic material, and an electric winding 40 supported by core 39.

In an embodiment not shown in the drawings, the rotor extends about the stator.

With reference to FIG. 2, vehicle 6 comprises a brake 41 at each wheel 17; and a speed sensor 42, which transmits a speed signal SV, related to the instantaneous speed of vehicle 6, to control unit 25.

Cable transportation system 1 according to the present disclosure generates electric power when vehicle 6 is moving, and uses the generated electric power to power user device 24, which indicates as a whole one or more user devices, such as an interior lighting system of vehicle 6, and exterior lighting system of vehicle 6, a heating system of vehicle 6, an air-conditioning system of vehicle 6, etc. User device 24 also represents as a whole a group of different user devices in general, and supplies an absorption signal SA to computing module 25B.

Operation wise, electric machines 21 at respective wheels 17 generate electric power which is stored in accumulator 23 by selector 22; and accumulator 23 powers user device 24, as required, by selector 22 and under the control of control unit 25 which coordinates operation of selector 22.

Electric machines 21 operate as generators along the whole of transportation path P, with the exception of the portions at passenger station 7, where control unit 25 operates electric machines 21 as generators, motors, and brakes, depending on circumstances.

Electric machines 21 on board vehicle 6, and brakes 41 eliminate the need to install, at each passenger station 7, the deceleration and acceleration conveyors described in Patent EP 0 687 607 B1.

Without deceleration conveyors, vehicle 6 is decelerated as follows: once the draw cable is detached from vehicle 6, vehicle 6 is braked by electric machines 21, which absorb power by operating as electric power generators, and by the normal rolling friction of wheels 17 and direction wheels 18 on rails 3. These braking forces, however, do not guarantee stoppage of vehicle 6 at stop position 7b and at the required speed. Moreover, the mass of vehicle 6 varies, depending on the number of passengers; and other uncontrollable parameters, such as external temperature and humidity, may also affect the forces in play when decelerating vehicle 6. For this reason, computing module 25B receives speed signal SV from sensor 42, and compares speed signal SV with a deceleration speed curve SVD corresponding to the ideal deceleration speed, as a function of time, from the start of deceleration portion 7a to stop position 7b. Whenever speed signal SV exceeds the ideal speed, according to deceleration speed curve SVD, by more than a given acceptance range, control unit 25 transmits an instantaneous actuating signal F1 to brakes 41.

When speed signal SV falls below the ideal speed by more than the relative acceptance range, regulating module 25C, under the control of computing module 25B, emits an actuating signal F2 to instantaneously operate at least one electric machine 21 as a motor.

The instantaneous speed SV of vehicle 6 is compared repeatedly with deceleration speed curve SVD and acceleration speed curve SVA, and, by successive adjustments, control unit 25 guides vehicle 6 into stop position 7b. Once the passengers have alighted or boarded, vehicle 6 is ready to depart.

Alternatively, vehicle 6 is braked solely by electric machines 21 operating as brakes. That is, when speed SV of vehicle 6 is greater than deceleration speed SVD, regulating module 25C, in accordance with instructions from computing module 25B, transmits a signal F2 to selector 22, which increases the electric absorption, and hence the braking force, of electric machines 21. Regulating the braking force of electric machines 21 allows brakes 41 to be omitted. Alternatively, electric machines 21 brake vehicle 6 together with brakes 41.

Operated as brakes, electric machines 21 may be used to advantage as emergency brakes: computing unit 25B is supplied by the control system (not shown) of cable transportation system 1 with a signal SRC relating to the integrity of draw cable 4. When signal SRC assumes a value indicating failure of draw cable 4, the computing module transmits a signal to regulating module 25C, which, by means of signal F2, sets selector 22 to maximum absorption (resistance) to enable electric machines 21 as brakes—in this case, as emergency brakes. In other words, selector 22 can be operated as a power dissipater.

The start signal to start vehicle 6 is received by control unit 25 from the control system (not shown) of cable transportation system 1; and, on receiving the start signal, control unit 25 commands selector 22 to power all the electric machines 21 as motors. In this case too, computing module 25B compares vehicle speed SV with an ideal acceleration speed curve SVA, calculated as a function of the speed SC of the cable, and accelerates or decelerates vehicle 6 by adjusting power supply to electric machines 21, depending on the deviation of speed signal SV with respect to acceleration speed curve SVA and the relative acceptance range. Vehicle 6 is thus brought to substantially the same speed as speed SC of draw cable 4 by the end of portion 7c, and can therefore be connected smoothly to draw cable 4.

In other words, the power supplied on board vehicle 6 is substantially that transmitted to draw cable 4 in the form of kinetic energy at drive station 5 and temporarily stored in accumulator 23 for use in accelerating vehicle 6. This power is supplied to user device 24, fed back to wheels 17 as drive power, and, if necessary, dissipated when operating electric machine 21 as a brake.

In the FIG. 4 embodiment, number 43 indicates a passenger "to-and-fro" cable transportation system, which comprises two parallel rails 44 defining a straight transportation path P1; a continuous draw cable 45 extending along transportation path P1; a drive station 46 for driving draw cable 45; a vehicle 47 movable along transportation path P1 and connected to draw cable 45; and two passenger stations 48 located at opposite ends of transportation path P1, and where vehicle 47 is stopped to allow passengers to board and alight from vehicle 47.

Drive station 46 comprises a winch 49 about axis A5; and an electric motor 50 for rotating winch 49 about axis A5, and moving draw cable 45 along path P1. Vehicle 47 is reversed and stopped at passenger stations 48 by winch 49.

Vehicle 47 is equipped with an electric machine 21 of the type described with reference to the first embodiment of the present disclosure, and which acts as a current generator, and, in the event of failure of draw cable 45, as an emergency brake and as a motor to return vehicle 47 to passenger station 48. The component parts are substantially the same as in the first embodiment, and operation differs solely as regards selective connection to the draw cable.

In transportation system 43, brake and motor operation of electric machine 21 assists operation of draw cable 45.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of driving a cable transportation system, said method comprising:
   advancing a passenger vehicle fitted with a plurality of wheels resting on a plurality of rails extending along a transportation path;
   causing a draw cable extending along the transportation path to drive the passenger vehicle, said draw cable being driven by a drive member;
   stopping the passenger vehicle at a passenger station located along the transportation path;
   causing the wheels of the passenger vehicle to drive an electric machine to generate electric power on board the vehicle outside said passenger station;
   causing a selector on board the passenger vehicle to regulate electric power flow to and from the electric machine;
   regulating selector dissipation of the electric power generated by the electric machine to regulate the braking force of the electric machine;
   causing a speed sensor to emit a speed signal related to a speed of the passenger vehicle,
   causing a control unit to compare the speed signal with an acceleration speed curve corresponding to a designated speed, as a function of time, along an acceleration portion of the transportation path, and
   emitting an actuating signal to regulate electric power supply to the electric machine if the speed signal deviates from the acceleration speed curve by more than a designated acceptance range.

2. The method of claim 1, which includes storing electric power in an accumulator on board the passenger vehicle.

3. The method of claim 1, which includes powering at least one user device on board the passenger vehicle with the electric power generated by the electric machine.

4. The method of claim 1, which includes supplying the electric power stored in an accumulator to the electric machine to power at least one of the wheels, wherein the passenger vehicle is configured to be selectively disconnected from the draw cable.

5. The method of claim 1, which includes operating each electric machine as a generator, a motor, and a brake, wherein the passenger vehicle includes a plurality of electric machines, each electric machine being fitted to a corresponding one of the wheels.

6. The method of claim 1, which includes:
   causing the control unit to compare the speed signal with a deceleration speed curve corresponding to a designated deceleration speed, as a function of time, along a deceleration portion of the transportation path, and
   emitting an actuating signal to instantaneously activate a brake if the speed signal exceeds the deceleration speed curve by more than a designated acceptance range.

7. The method of claim 1, which includes:
   causing the control unit to compare the speed signal with a deceleration speed curve corresponding to a designated deceleration speed, as a function of time, along a deceleration portion of the transportation path, and
   emitting an actuating signal to regulate electric power supply to the electric machine if the speed signal falls below the deceleration speed curve by more than a designated acceptance range.

8. A method of driving a cable transportation system, said method comprising:
   advancing a passenger vehicle fitted with a plurality of wheels along a transportation path;

causing a draw cable extending along the transportation path to drive the passenger vehicle, said draw cable being driven by a drive member;

braking the passenger vehicle to stop the passenger vehicle at one passenger station located along the transportation path;

causing a speed sensor to emit a speed signal related to a speed of the passenger vehicle;

comparing the speed signal with a deceleration speed curve corresponding to an ideal deceleration speed, as a function of time, along a deceleration portion of the transportation path;

causing an electric machine driven by a wheel of the passenger vehicle to generate electric power on board the passenger vehicle irrespective of any braking of the passenger vehicle;

storing electric power in an accumulator on board the passenger vehicle;

emitting an actuating signal to one of: (i) instantaneously activate a brake if the speed signal exceeds the deceleration speed curve by more than a designated acceptance range, and (ii) regulate electric power supply to the electric machine if the speed signal falls below the deceleration speed curve by more than a designated acceptance range; and powering at least one user device on board the passenger vehicle with the electric power generated by the electric machine.

9. The method of claim 8, which includes supplying the electric power stored in the accumulator to the electric machine to power at least one of the wheels, wherein the passenger vehicle is configured to be disconnected selectively from the draw cable.

10. The method of claim 8, which includes operating each electric machine as a generator, a motor, and a brake, wherein the passenger vehicle includes a plurality of electric machines, each electric machine being fitted to a corresponding one of the wheels.

11. A cable transportation system including a passenger vehicle drawn by a draw cable, said cable transportation system comprising:

a wheel configured to roll along a transportation path, said wheel including a hub configured to rotate about a pin, the hub including an annular portion which defines a rotor seat; and an electric machine fitted to the wheel and driven by the wheel to generate, independent of any braking of any passenger vehicle, electric power on board the passenger vehicle, said electric machine including a stator and a rotor fitted to the hub.

12. The cable transportation system of claim 11, wherein the electric machine is reversible, and configured to supply drive torque to said wheel.

13. The cable transportation system of claim 11, wherein the hub supports a wheel rim, and the wheel rim supports a tire.

14. The cable transportation system of claim 11, which includes at least one bearing interposed between the pin and the hub.

15. The cable transportation system of claim 11, wherein the electric power is used in association of at least one selected from the group consisting of: an interior lighting system of the passenger vehicle, an exterior lighting system of the passenger vehicle, a heating system of the passenger vehicle, and an air-conditioning system of the passenger vehicle.

16. A method of driving a cable transportation system, said method comprising:

advancing a passenger vehicle fitted with a plurality of wheels along a transportation path;

causing a draw cable extending along the transportation path to drive the passenger vehicle, said draw cable being driven by a drive member;

causing a speed sensor to emit a speed signal related to a speed of the passenger vehicle;

causing a control unit to compare the speed signal with an acceleration speed curve corresponding to an ideal speed, as a function of time, along an acceleration portion of the transportation path;

braking the passenger vehicle to stop the passenger vehicle at one passenger station located along the transportation path;

causing an electric machine driven by a wheel of the passenger vehicle to generate electric power on board the passenger vehicle irrespective of any braking of the passenger vehicle;

storing electric power in an accumulator on board the passenger vehicle;

emitting an actuating signal to regulate electric power supply to the electric machine if the speed signal deviates from the acceleration speed curve by more than a designated acceptance range; and powering at least one user device on board the passenger vehicle with the electric power generated by the electric machine.

17. The method of claim 16, which includes supplying the electric power stored in the accumulator to the electric machine to power at least one of the wheels, wherein the passenger vehicle is configured to be disconnected selectively from the draw cable.

18. The method of claim 16, which includes operating each electric machine as a generator, a motor, and a brake, wherein the passenger vehicle includes a plurality of electric machines, each electric machine being fitted to a corresponding one of the wheels.

19. A cable transportation system including a passenger vehicle drawn by a draw cable, said cable transportation system comprising:

a wheel configured to roll along a transportation path, said wheel including a hub configured to rotate about a pin;

an electric machine fitted to the wheel and driven by the wheel to generate, independent of any braking of any passenger vehicle, electric power on board the passenger vehicle, said electric machine including a stator and a rotor fitted to the hub; and a cover formed by two connected flanges, wherein said cover encloses the stator.

20. The cable transportation system of claim 19, wherein the electric machine is reversible, and configured to supply drive torque to said wheel.

21. The cable transportation system of claim 19, wherein the hub supports a wheel rim, and the wheel rim supports a tire.

22. The cable transportation system of claim 19, which includes at least one bearing interposed between the pin and the hub.

23. The cable transportation system of claim 19, wherein the cover is fixed to pin, and is configured to support the stator and configured to protect the electric machine.

24. The cable transportation system of claim 19, wherein the electric power is used in association of at least one selected from the group consisting of: an interior lighting system of the passenger vehicle, an exterior lighting system of the passenger vehicle, a heating system of the passenger vehicle, and an air-conditioning system of the passenger vehicle.

25. A cable transportation system including a passenger vehicle drawn by a draw cable, said cable transportation system comprising:

a wheel configured to roll along a transportation path, said wheel including a hub configured to rotate about a pin; and an electric machine fitted to the wheel and driven by the wheel to generate, independent of any braking of any passenger vehicle, electric power on board the passenger vehicle, said electric machine including a stator and a rotor fitted to the hub, wherein the stator includes a core of ferromagnetic material, and an electric winding supported by core.

26. The cable transportation system of claim 25, wherein the electric machine is reversible, and configured to supply drive torque to said wheel.

27. The cable transportation system of claim 25, wherein the hub supports a wheel rim, and the wheel rim supports a tire.

28. The cable transportation system of claim 25, which includes at least one bearing interposed between the pin and the hub.

29. The cable transportation system of claim 25, wherein the electric power is used in association of at least one selected from the group consisting of: an interior lighting system of the passenger vehicle, an exterior lighting system of the passenger vehicle, a heating system of the passenger vehicle, and an air-conditioning system of the passenger vehicle.

30. A cable transportation system including a passenger vehicle drawn by a draw cable, said cable transportation system comprising:

a wheel configured to roll along a transportation path, said wheel including a hub configured to rotate about a pin;

an electric machine fitted to the wheel and driven by the wheel to generate, independent of any braking of any passenger vehicle, electric power on board the passenger vehicle, said electric machine including a stator and a rotor fitted to the hub; and a speed sensor configured to transmit a speed signal to a control unit.

31. The cable transportation system of claim 30, wherein the electric machine is reversible, and configured to supply drive torque to said wheel.

32. The cable transportation system of claim 30, wherein the hub supports a wheel rim, and the wheel rim supports a tire.

33. The cable transportation system of claim 30, which includes at least one bearing interposed between the pin and the hub.

34. The cable transportation system of claim 30, wherein the electric power is used in association of at least one selected from the group consisting of: an interior lighting system of the passenger vehicle, an exterior lighting system of the passenger vehicle, a heating system of the passenger vehicle, and an air-conditioning system of the passenger vehicle.

* * * * *